United States Patent
Hwang et al.

(10) Patent No.: US 11,823,806 B2
(45) Date of Patent: Nov. 21, 2023

(54) NUCLEAR REACTOR DISMANTLEMENT SYSTEM

(71) Applicant: KOREA HYDRO & NUCLEAR POWER CO., LTD., Gyeongju-si (KR)

(72) Inventors: Young Hwan Hwang, Daejeon (KR); Mi-Hyun Lee, Daejeon (KR); Sung-Hoon Hong, Daegu (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 104 days.

(21) Appl. No.: 17/257,913

(22) PCT Filed: Jul. 3, 2019

(86) PCT No.: PCT/KR2019/008152
§ 371 (c)(1),
(2) Date: Jan. 5, 2021

(87) PCT Pub. No.: WO2020/009476
PCT Pub. Date: Jan. 9, 2020

(65) Prior Publication Data
US 2021/0280330 A1      Sep. 9, 2021

(30) Foreign Application Priority Data
Jul. 6, 2018  (KR) ........................ 10-2018-0078940

(51) Int. Cl.
*G21D 1/00*      (2006.01)
*G21C 1/08*      (2006.01)
(52) U.S. Cl.
CPC ............. *G21D 1/003* (2013.01); *G21C 1/086* (2013.01)

(58) Field of Classification Search
CPC ...................................................... G21D 1/003
See application file for complete search history.

(56) References Cited

U.S. PATENT DOCUMENTS

| | | | | |
|---|---|---|---|---|
| 5,225,150 A | * | 7/1993 | Malandra | G21C 11/00 376/263 |
| 5,301,212 A | * | 4/1994 | Jacquier | G21F 9/30 376/260 |
| 5,329,562 A | * | 7/1994 | Kubo | B23D 57/0084 376/260 |
| 6,049,580 A | * | 4/2000 | Bodin | B24C 1/045 376/316 |

(Continued)

FOREIGN PATENT DOCUMENTS

| | | | | |
|---|---|---|---|---|
| DE | 19639498 A1 | * | 4/1998 | ............. G21D 1/003 |
| JP | 07159596 A | * | 6/1995 | |

(Continued)

OTHER PUBLICATIONS

EPO, Search Report of EP 19831295.1 dated Mar. 11, 2022.

*Primary Examiner* — Lily C Garner
(74) *Attorney, Agent, or Firm* — LEX IP MEISTER, PLLC

(57) ABSTRACT

A nuclear reactor dismantlement system according to an embodiment includes bio-protective concrete including a first space into which a reactor is inserted and a second space that is connected to the first space and is expanded in the first space, a moving device that is positioned in the second space and moves the reactor, and a cutting device that is positioned in the second space and cuts the reactor.

5 Claims, 3 Drawing Sheets

(56) References Cited

U.S. PATENT DOCUMENTS

| | | | |
|---|---|---|---|
| 6,087,546 A * | 7/2000 | Griffiths | G21F 9/36 250/507.1 |
| 6,198,787 B1 * | 3/2001 | Hasegawa | G21D 1/003 376/268 |
| 8,189,731 B2 * | 5/2012 | Jugl | G21C 19/00 376/260 |
| 10,014,083 B2 | 7/2018 | Harkness et al. | |
| 10,854,345 B2 * | 12/2020 | Snuggerud | G21C 17/10 |
| 2002/0186806 A1 * | 12/2002 | Aoki | G21D 1/003 376/260 |
| 2003/0043953 A1 * | 3/2003 | Aoki | G21D 1/00 376/260 |
| 2013/0294565 A1 * | 11/2013 | Harkness | G21C 11/022 376/268 |
| 2015/0228364 A1 * | 8/2015 | Heim | G21D 3/00 376/260 |
| 2016/0203882 A1 * | 7/2016 | Harkness | G21C 1/086 376/271 |
| 2018/0190400 A1 * | 7/2018 | Okamoto | G21C 19/04 |

FOREIGN PATENT DOCUMENTS

| | | |
|---|---|---|
| JP | 08-075892 | 3/1996 |
| JP | 08-240693 | 9/1996 |
| JP | 08240693 A * | 9/1996 |
| JP | 3597570 B2 * | 12/2004 |
| JP | 4644181 B2 * | 3/2011 |
| JP | 2012-093181 | 5/2012 |
| JP | 2012093181 A * | 5/2012 |
| JP | 2015-111052 | 6/2015 |
| JP | 2015-517654 | 6/2015 |
| JP | 2017-116488 | 6/2017 |
| KR | 100241139 B1 * | 2/2000 |
| KR | 0305385 | 11/2001 |
| KR | 1503288 | 3/2015 |
| KR | 2015-0075822 | 7/2015 |
| KR | 10-1754538 | 7/2017 |
| KR | 101754538 B1 * | 7/2017 |
| KR | 102051398 B1 * | 3/2019 |
| KR | 102027198 B1 * | 6/2019 |

\* cited by examiner

NUCLEAR REACTOR DISMANTLEMENT SYSTEM

TECHNICAL FIELD

The present invention relates to a nuclear reactor dismantlement system.

BACKGROUND ART

As fossil energy is depleted worldwide, nuclear power generation is being used as a major energy source. In such nuclear power generation, a generally-used pressurized water reactor (PWR) type of nuclear power plant consists of a primary system circulating through a nuclear reactor, a secondary system circulating through a steam generator, and a tertiary system circulating through a condenser. Specifically, in the primary system, pressure is applied to a coolant in a reactor to maintain a pressure of 150 atm and 300° C., and in the secondary system, the coolant passes through tubes of a steam generator and boils water of the steam generator side to generate steam to turn a turbine. In the tertiary system, the steam turns the turbine, and then passes through the condenser and becomes water again and is sent to the steam generator.

The reactor of such a pressurized water reactor type of nuclear power plant is contaminated with radioactivity. Therefore, when the reactor is cut and dismantled, radioactive dust such as aerosol and slag may diffuse and contaminate peripheral devices.

DISCLOSURE

Technical Problem

The present embodiment relates to a reactor dismantlement system that may prevent contamination of peripheral devices by radioactive dust generated during a dismantling process thereof.

Technical Solution

A nuclear reactor dismantlement system according to an embodiment includes bio-protective concrete including a first space into which a reactor is inserted and a second space that is connected to the first space and is expanded in the first space, a moving device that is positioned in the second space and moves the reactor, and a cutting device that is positioned in the second space and cuts the reactor.

A floor portion of the second space may have a step, and a leveling device positioned on the floor portion to maintain a level of the moving device may be further included.

The floor portion of the second space may include a first floor portion and a second floor portion having a position higher than that of the first floor portion, and the leveling device may be positioned on the first floor portion to support the moving device.

The moving device may linearly move or rotate the reactor.

The first space may be positioned at the second floor portion, and the moving device may overlap the first space to contact the second floor portion.

The nuclear reactor dismantlement system may further include a shielding film covering the second space to block radioactive dust from diffusing to the outside, wherein the shielding film may include a plurality of ventilation parts.

A dust collecting device connected to the plurality of ventilation parts to collect the radioactive dust may be further included.

Advantageous Effects

According to the embodiment, since a reactor may be cut and dismantled by mounting it in a second space connected to a first space by using a leveling device and a moving device, separate expansion work is not required to secure the second space, thereby reducing a dismantling cost and time.

In addition, since a dismantling process is performed while a reactor is supported by using a leveling device and a moving device in a second space, a separate lifting device for dismantling the reactor in a first space is not required. Therefore, it is possible to reduce a dismantling cost.

Further, since radioactive dust generated by a cutting device may be blocked from the outside by using a shielding film and a dispersing-collecting device and may be intensively collected by using a ventilation part, it is possible to minimize radioactive dust from contaminating a peripheral device or being exposed to a worker.

MODE FOR INVENTION

Figure 1:
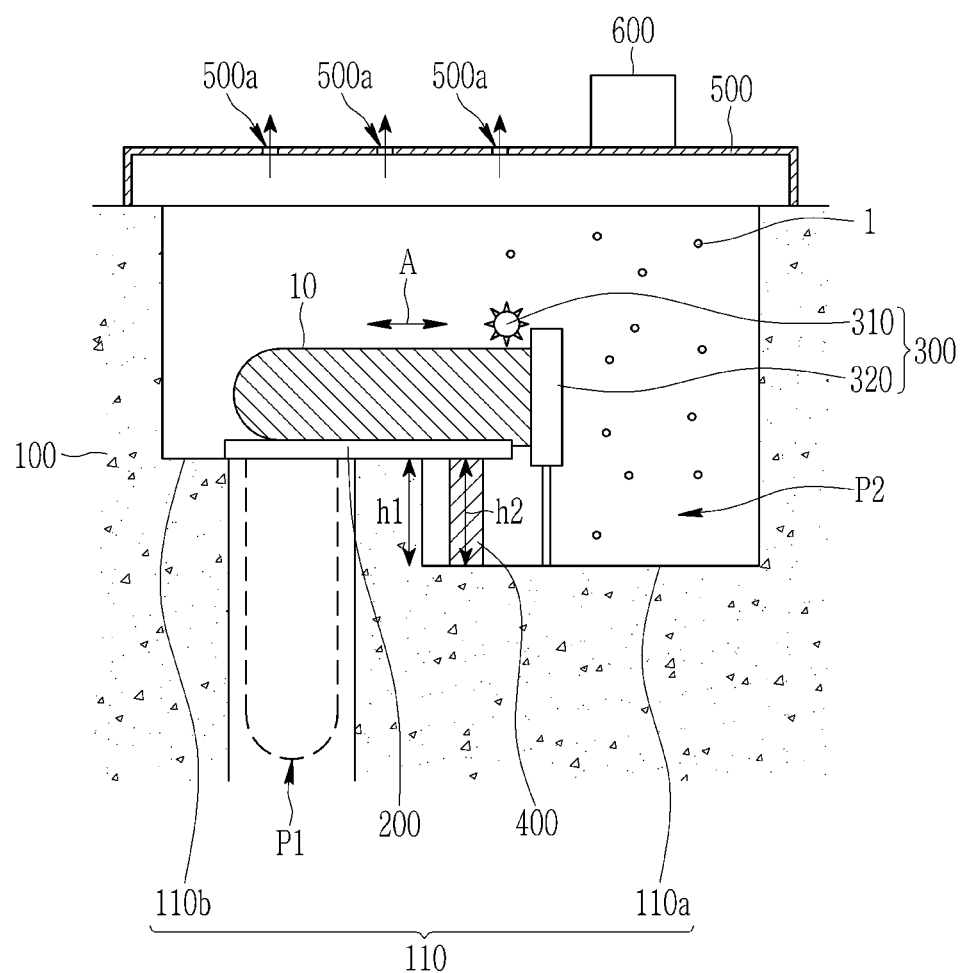
FIG. 1 illustrates a side view of a nuclear reactor dismantlement system according to an embodiment.

The present invention will be described more fully hereinafter with reference to the accompanying drawings, in which embodiments of the invention are shown. As those skilled in the art would realize, the described embodiment may be modified in various different ways, all without departing from the spirit or scope of the present invention.

In order to clearly describe the present invention, parts that are irrelevant to the description are omitted, and identical or similar constituent elements throughout the specification are denoted by the same reference numerals.

Further, in the drawings, the size and thickness of each element are arbitrarily illustrated for ease of description, and the present disclosure is not necessarily limited to those illustrated in the drawings.

Figure 2:
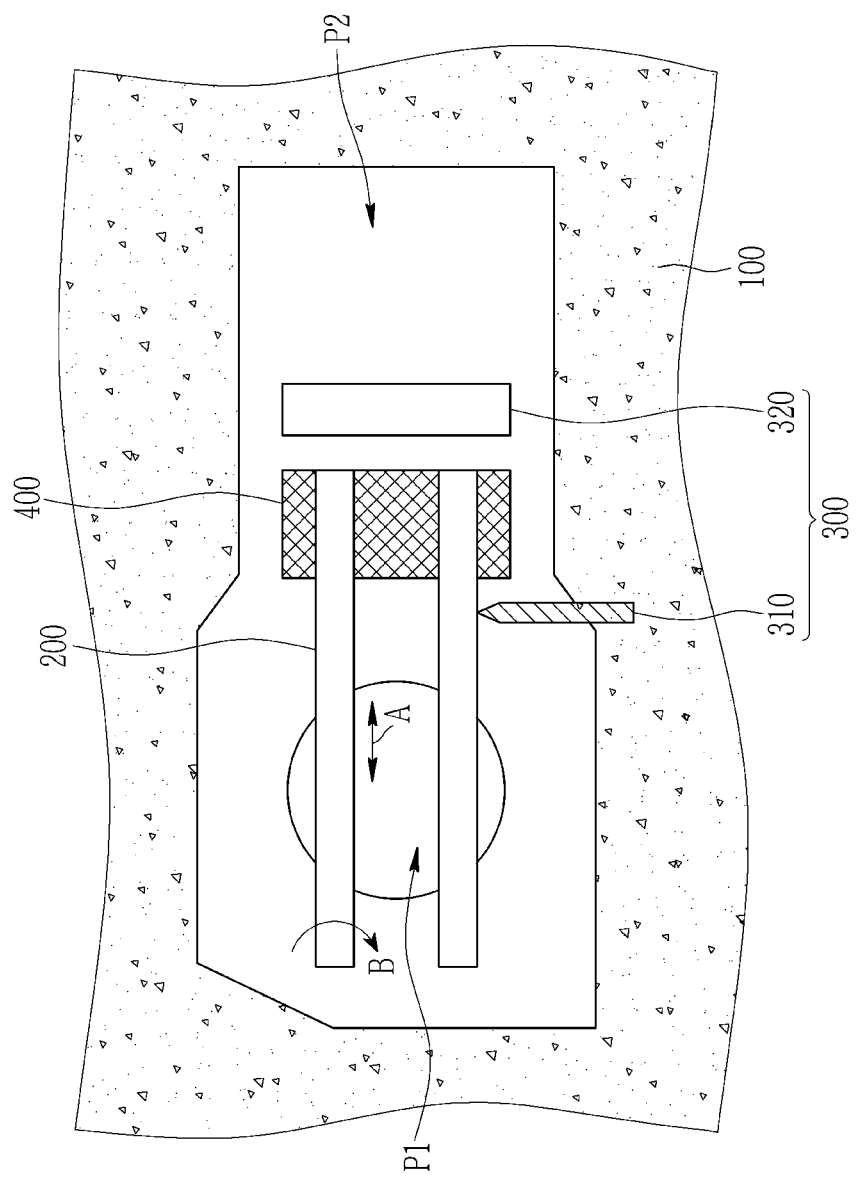
FIG. 2 illustrates a top plan view of a nuclear reactor dismantlement system according to an embodiment.

FIG. 1 illustrates a side view of a nuclear reactor dismantlement system according to an embodiment, and FIG. 2 illustrates a top plan view of a nuclear reactor dismantlement system according to an embodiment.

As shown in FIG. 1 and FIG. 2, a nuclear reactor dismantlement system according to an embodiment includes bio-protective concrete 100 in which a reactor 10 is positioned, a moving device 200 for supporting the reactor 10 and moving the reactor 10, a cutting device 300 for cutting the reactor 10, a leveling device 400 for maintaining a level of the moving device 200, a shielding film 500 for blocking the bio-protective concrete 100 from the outside, and a dust collecting device 600 for collecting radioactive dust 1 generated by the cutting device 300.

The bio-protective concrete 100 may have a first space P1 into which the reactor 10 is inserted, and a second space P2 that is connected to the first space P1 and in which the reactor 10 is dismantled. The second space P2 is a larger and more expanded space than the first space P1. A floor portion 110 of the second space P2 may have a step. That is, the floor portion 110 of the second space P2 may include a first floor portion 110a and a second floor portion 110b having a higher position than that of the first floor portion 110a. The first space P1 may be positioned on the second floor portion 110b.

The moving device 200 is positioned in the second space P2, and may move the reactor 10 that is horizontally disposed. The moving device 200 may have a rail structure. The moving device 200 may linearly move the reactor 10 in a straight line direction (A) or rotate it in a rotation direction (B). Accordingly, the reactor 10 may be dismantled by cutting a portion of the reactor at a desired position by using the cutting device 300.

The moving device 200 may overlap the first space P1 to contact the second floor portion 110b.

The cutting device 300 is positioned in the second space P2, and may cut and dismantle the reactor 10. The cutting device 300 may include a thermal cutting device, a mechanical cutting device such as a wire saw, or an electrical cutting device such as a laser. However, the cutting device 300 is not limited thereto, and various devices capable of cutting the reactor 10 are applicable to the cutting device 300.

The cutting device 300 may include a cutting part 310 for cutting the reactor 10 and a driving part 320 for driving the cutting part 310.

The leveling device 400 is positioned at the first floor portion 110a of the second space P2 to support the moving device 200, thereby maintaining a level of the moving device 200. That is, a height h2 of the leveling device 400 may be the same as a height h1 of the first floor portion 110a.

Accordingly, a space for cutting the reactor 10 using the cutting device 300 may be secured, by using the leveling device 400 to support the reactor 10 that is horizontally disposed.

As described above, since the reactor 10 may be cut and dismantled by displacing the reactor 10 in the second space P2 connected to the first space P1 by using the leveling device 400 and the moving device 200, separate expansion work is not required to secure the second space P2, thereby reducing dismantling cost and time.

In addition, since the dismantling process is performed while the reactor 10 is supported by using the leveling device 400 and the moving device 200 in the second space P2, a separate lifting device for dismantling the reactor in the first space P1 is not required. Therefore, it is possible to reduce a dismantling cost.

Figure 3:
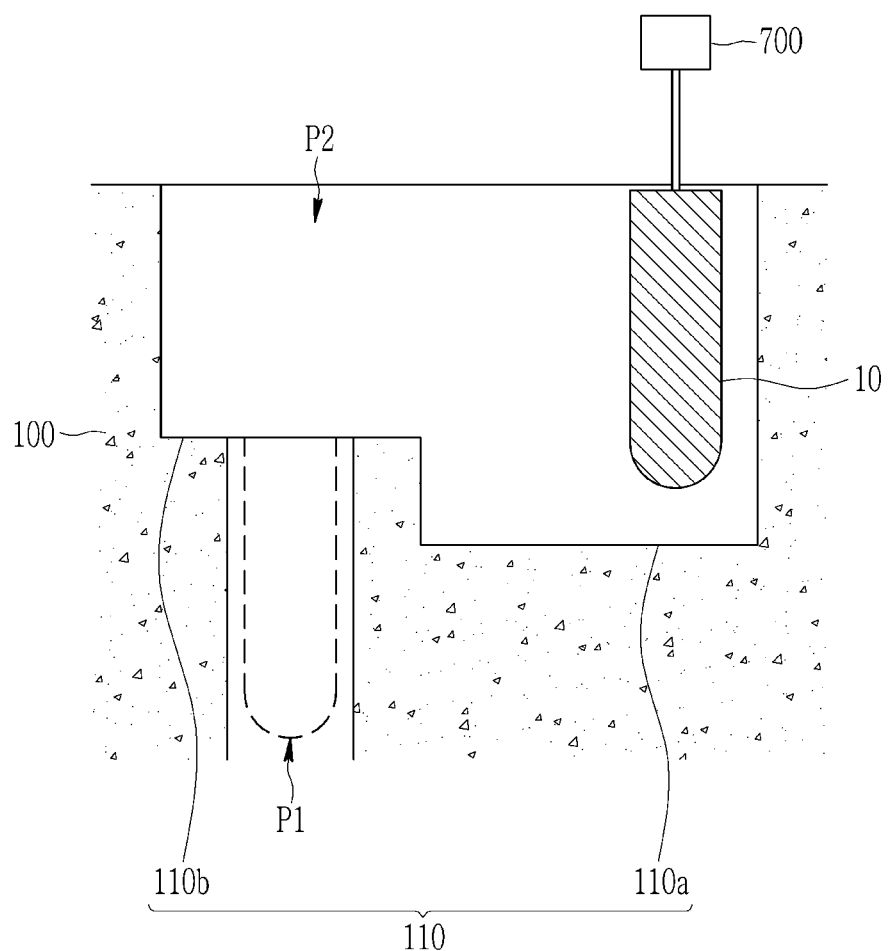
FIG. 3 illustrates one step of dismantling a reactor using a nuclear reactor dismantlement system according to an embodiment.

FIG. 3 illustrates one step of dismantling a reactor using a nuclear reactor dismantlement system according to an embodiment.

As shown in FIG. 3, the reactor 10, which is positioned in the first space P1, is moved into the second space P2 by using a separate crane 700. In addition, as shown in FIG. 1, the leveling device 400 is installed on the first floor 110a of the second space P2, and the moving device 200 is installed. Accordingly, since the moving device 200 is supported by the leveling device 400 and the second floor portion 110b, it is horizontally maintained.

Meanwhile, the shielding film 500 may cover the second space P2 to block the radioactive dust 1 from diffusing to the outside. The shielding layer 500 may include a plurality of ventilation parts 500a.

The dust collecting device 600 may be connected to the plurality of ventilation parts 500a to intensively collect the radioactive dust 1 collected through the ventilation parts 500a.

Accordingly, even if the radioactive dust 1 such as slag, fume gas, aerosol, etc. is generated when the reactor 10 is cut by using the cutting device 300, the shielding film 500 may block the radioactive dust 1 from diffusing to the outside.

In the present embodiment, the dust collecting device 600 is installed on the shielding film 500, but is not limited thereto, and may be installed at various positions.

As describe above, since the radioactive dust 1 generated by the cutting device 300 may be blocked from the outside by using the shielding film 500 and the dust collecting device 600 and may be intensively collected by using the ventilation part 500a, it is possible to minimize the radioactive dust 1 from contaminating peripheral devices or being exposed to workers.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A nuclear reactor dismantlement system, comprising
a bio-protective concrete including a first space into which a reactor is vertically inserted and a second space that is connected to the first space and has a stepped floor including a first floor and a second floor having a higher position than that of the first floor,
a first moving device that vertically moves the reactor from the first space to the second space and horizontally moves the reactor in the second space,
a second moving device that is positioned on the second floor of the second space and horizontally moves the reactor horizontally disposed on the second moving device,
a cutting device that is positioned in the second space and cuts the reactor, and
a leveling device positioned between the first floor of the second space and the second moving device to maintain a level of the second moving device,
wherein the second moving device is configured to horizontally move the reactor horizontally disposed on the second moving device as a whole before being cut into pieces and the cutting device is configured to cut the reactor that is horizontally moved by the second moving device.

2. The nuclear reactor dismantlement system of claim 1, wherein
the second moving device linearly moves or rotates the reactor.

3. The nuclear reactor dismantlement system of claim 1, wherein
the first space is connected to the second space at the second floor portion, and
the second moving device overlaps the first space to contact the second floor portion.

4. The nuclear reactor dismantlement system of claim 1, further comprising
a shielding film covering the second space to block radioactive dust from diffusing to the outside,
wherein the shielding film includes a plurality of ventilation parts.

5. The nuclear reactor dismantlement system of claim 4, further comprising a dust collecting device connected to the plurality of ventilation parts to collect the radioactive dust.

\* \* \* \* \*